(12) United States Patent
Minami et al.

(10) Patent No.: US 8,918,590 B2
(45) Date of Patent: Dec. 23, 2014

(54) READING CORE DATA IN A RING BUS TYPE MULTICORE SYSTEM

(75) Inventors: Aya Minami, Yamato (JP); Yohichi Miwa, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 574 days.

(21) Appl. No.: 13/311,349

(22) Filed: Dec. 5, 2011

(65) Prior Publication Data

US 2012/0151152 A1    Jun. 14, 2012

(30) Foreign Application Priority Data

Dec. 9, 2010   (JP) .................................. 2010-274556

(51) Int. Cl.
*G06F 13/00* (2006.01)
*G06F 12/08* (2006.01)

(52) U.S. Cl.
CPC .................................. *G06F 12/0831* (2013.01)
USPC .................................. 711/141; 711/E12.026

(58) Field of Classification Search
CPC .......................... G06F 12/0882; G06F 12/0822
See application file for complete search history.

(56) References Cited

U.S. PATENT DOCUMENTS

| | | | | |
|---|---|---|---|---|
| 6,253,292 B1 * | 6/2001 | Jhang et al. | .................... | 711/146 |
| 7,069,362 B2 * | 6/2006 | Blake et al. | .................... | 710/107 |
| 8,140,828 B2 * | 3/2012 | Shen et al. | ....................... | 712/30 |
| 2002/0042860 A1 * | 4/2002 | Murakami et al. | ............. | 711/118 |
| 2004/0230726 A1 * | 11/2004 | Blake et al. | .................... | 710/100 |
| 2004/0230752 A1 * | 11/2004 | Blake et al. | .................... | 711/147 |
| 2005/0240735 A1 * | 10/2005 | Shen et al. | ..................... | 711/144 |
| 2007/0055828 A1 * | 3/2007 | Tsien | ............................. | 711/141 |
| 2009/0007119 A1 * | 1/2009 | Blumrich et al. | ............. | 718/102 |
| 2009/0144524 A1 * | 6/2009 | Shen et al. | ....................... | 712/30 |
| 2009/0193232 A1 * | 7/2009 | Watanabe | ...................... | 712/205 |
| 2012/0151152 A1 | 6/2012 | Minami et al. | | |
| 2012/0287779 A1 * | 11/2012 | Sugawara | ..................... | 370/228 |
| 2013/0144626 A1 * | 6/2013 | Shau | ............................. | 704/270 |
| 2014/0214955 A1 * | 7/2014 | Vash et al. | .................... | 709/204 |

FOREIGN PATENT DOCUMENTS

| | | |
|---|---|---|
| JP | 06-314239 A | 11/1994 |
| JP | 11-134312 A | 5/1999 |
| JP | 2001-222517 A | 8/2001 |
| JP | 2006244460 A | 9/2006 |
| JP | 2009176179 A | 8/2009 |

\* cited by examiner

*Primary Examiner* — Sean D Rossiter
(74) *Attorney, Agent, or Firm* — James R. Nock

(57) ABSTRACT

The present invention provides a ring bus type multicore system including one memory, a main memory controller for connecting the memory to a ring bus; and multiple cores connected in the shape of the ring bus, wherein each of the cores further includes a cache interface and a cache controller for controlling or managing the interface, and the cache controller of each of the cores connected in the shape of the ring bus executes a step of snooping data on the request through the cache interface; and when the cache of the core holds the data, a step of controlling the core to receive the request and return the data to the requester core, or, when the cache of the core does not hold the data, the main memory controller executes a step of reading the data from the memory and sending the data to the requester core.

6 Claims, 5 Drawing Sheets

ADDRESS DATA READING STEPS (1) TO (5)

CONTENT OF ACCESS HISTORY WHEN CORE X READS ADDRESS DATA 01

| ADDRESS ENTRY OF CACHE MEMORY / CORE NO. | A HOLD, WRITE | | B HOLD, WRITE | | ... | W HOLD, WRITE | | X HOLD, WRITE | | Y HOLD, WRITE | | Z HOLD, WRITE | |
|---|---|---|---|---|---|---|---|---|---|---|---|---|---|
| 00 | N | N | N | N | | N | N | Y | N | Y | N | N | N |
| 01 | N | N | Y | N⇒Y | | N | N | N | N | N | N | N | Y |
| 02 | Y | N | N | N | | READ DATA NOT HELD | | Y | N | N | N | N | N |
| 03 | Y | N | N | N | | | | Y | N | N | N | N | N |
| 04 | N | N | Y | N | | N | N | Y | N | N | N | N | Y |
| 05 | N | N | Y | N | | N | N | Y | N | N | N | Y | Y |
| 06 | N | N | Y | N | | N | N | Y | N | N | N | Y | Y |
| ....... | | | | | | | | | | | | | |

WRITE FLAG (at 01, B: N⇒Y)

FIG. 5

READING CORE DATA IN A RING BUS TYPE MULTICORE SYSTEM

FIELD OF THE INVENTION

The present invention relates to reading core data in a ring bus type multicore system in which one memory interface is shared among multiple CPU cores (also simply called CPUs, processors, or cores).

BACKGROUND OF THE INVENTION

In a ring bus type multicore CPU for sharing one memory interface among multiple cores, accesses to a main memory are concentrated. In the normal operation, each CPU core has a cache, respectively, to read data actually from a shared main memory. Instead of reading of data from one main memory, it is considered a method of reading the data from cache data stored in each CPU core.

For example, a Read request is issued from a certain CPU core (called a "requester core"). In a conventional multicore structure, a main memory controller makes inquiries to the other CPU cores about the presence or absence of cache data instead of reading the data from the main memory. The CPU cores receiving the inquiries searches their caches for the data.

In a multicore operating environment, it is often the case that any of the CPU cores holds, in its cache, data of the same address as the main memory (called the address data). In this case, there is a conventional method in which the main memory controller issues an instruction to a requester core to transfer the cache content so that the data will be sent. However, this method takes time in proportion to the number of packed cores because inquiries to respective cores have to be made in order. Further, the inquiries to the respective CPU cores suffer from a high load placed on the main memory controller.

The following will describe snooping for coherence to ensure the coherency of data held in each cache in a structure of multiple CPU cores. In a multiprocessor equipped with cache memories, the coherency of data used in processing among multiple processors needs to be maintained. Bus snooping is often employed to maintain the coherency of data in conventional processors. Bus snooping is a function to watch transactions on a memory interface bus shared among respective processors and detect whether a transaction related to data in a cache memory allocated to each processor occurs.

When a transaction related to data in the cache memory allocated to a specific processor occurs, the processor updates a corresponding entry in the cache memory. Each of the other processors is notified of this update by snooping to set a dirty flag for the data stored in its cache so that the data will not be used, thus managing data in the entire multiprocessor system.

Japanese Patent Application Publication No. 2006-244460 provides a processor equipped with a cache memory capable of keeping the coherency of data among processors with excellent operational efficiency in a multiprocessor system. However, Patent Document 1 describes a model in which multiple processor cores have a single cache, which is different from a model in which respective processor cores have respective caches.

Japanese Patent Application Publication No. 2009-176179 discloses a technique using multiple processor cores having respective caches to make effective use of cache data held in respective processor cores. This technique shows a processing method used when a processor core fetches data from a main memory and a different processor core fetches the same memory data.

SUMMARY OF THE INVENTION

Patent documents or the like disclose that snooping is used to perform an update for the coherency of address data. However, upon reading multiple CPU cores connected in the shape of a ring bus, each core is not used for bus transaction reference. In other words, no conventional techniques mention that upon reading address data on multiple CPU cores connected in the shape of a ring bus, each core snoops bus transactions.

Therefore the present invention provides a ring bus type multicore system for sharing one memory interface among multiple cores, and data reading method by each core.

In order to achieve this, the present invention provides a ring bus type multicore system in which one memory interface is shared among multiple cores and one core (requester core) makes a read request for data present in the memory. This ring bus type multicore system includes one memory, a main memory controller for connecting the memory to a ring bus; and multiple cores connected in the shape of the ring bus, wherein each of the cores further includes a cache interface and a cache controller for controlling or managing the interface, and the cache controller of each of the cores connected in the shape of the ring bus executes:

(1) a step of snooping data on the request through the cache interface; and (2) when the cache of the core holds the data, a step of controlling the core to receive the request and return the data to the requester core, or (3) when the cache of the core does not hold the data, the main memory controller executes a step of reading the data from the memory and sending the data to the requester core.

The present invention further provides a ring bus type multicore system in which one memory interface is shared among multiple cores and one core (requester core) makes a Read request for data present in the memory. This ring bus type multicore system includes one memory, a main memory controller for connecting the memory to a ring bus, and multiple cores connected in the shape of the ring bus, wherein each of the cores further includes a cache interface and a cache controller for controlling the interface, and the main memory controller further includes a history of data held in caches of all the cores, and in response to the request flowing in a predetermined path direction from the requester core to the main memory controller, the cache controller of each of the cores connected in the shape of the ring bus executes:

(1) a step of snooping data on the request through the cache interface; and (2) when the cache of the core connected in the predetermined path direction holds the data, a step of controlling the core to receive the request and return the data to the requester core, or (3) when the cache of the core connected in the predetermined path direction does not hold the data, the main memory controller (a) references the history of each core, and (b) when any core connected in the shape of the ring bus in a reverse path direction to the predetermined path direction holds corresponding data, executes: a step of sending the request to the core and causing the cache controller of the core to send the data held in the cache to the requester core; or (c) when no core connected to the ring bus in the reverse path direction to the predetermined path direction holds corresponding data, a step of reading the data from the memory and sending the data to the requester core.

In one embodiment of this ring bus type multicore system, the history includes, for each of the cores, a flag indicative of holding data on the address (address data) of the memory and a write flag to another core.

Another feature of this ring bus type multicore system is such that the cache controller selects, as the predetermined path direction, a path direction with a larger number of cores connected in two path directions from the requester core to the main memory controller.

Still another feature of this ring bus type multicore system is such that the cache controller references the history to calculate traffic of the ring bus from the data hold flag and select a path direction with less traffic as the predetermined path direction.

Yet another feature of this ring bus type multicore system is such that the main memory controller references the history to check for the presence of the data in a core connected to a path reverse to that in the predetermined path direction.

Further, the present invention provides a method of causing one core (requester core) to read data present in a memory in a ring bus type multicore CPU for sharing one memory interface among multiple cores. In this method, the multicore CPU includes one memory, a main memory controller for connecting the memory to a ring bus, and the multiple cores connected in the shape of the ring bus, and each of the cores further includes a cache interface and a cache controller for controlling pr managing the interface, and the main memory controller further includes a history of data held in all the cores, and in response to the request flowing in a predetermined path direction from the requester core to the controller, the cache controller of each core connected in the shape of the ring bus includes:
  (1) a step of snooping data on the request through the cache interface; and
  (2) when the cache of the core connected in the path direction holds the data, a step of controlling the core to receive the request and return the data to the requester core, or
  (3) when the cache of the core connected in the path direction does not hold the data, the main memory controller
    (a) references the history of each core, and
    (b) when any core connected in the shape of the ring bus in a reverse path direction to the path direction holds corresponding data, executes: a step of sending the request to the core and causing the cache controller of the core to send the data held in the cache to the requester core; or
    (c) when no core connected in the shape of the ring bus in the reverse path direction to the path direction holds corresponding data, a step of reading the data from the memory and sending the data to the requester core.

As described above, according to the present invention, the load on the main memory controller and the total time required for all memory accesses can be reduced in the ring bus type multicore system for sharing one main memory.

BRIEF DESCRIPTION OF THE DRAWINGS

FIG. 5 shows the content of an access history of each core held in a main memory controller.

DETAILED DESCRIPTION OF THE INVENTION

Data reading in a ring bus type multicore system for sharing a memory interface among multiple CPU cores according to an embodiment (hereinafter simply called the "embodiment") of the present invention will be described. Note that the following embodiment is an illustrative example and not intended to limit the content of the present invention.

A chip with a ring bus type multicore system packed thereon includes the following:

1. Each CPU core is equipped with a cache interface. This interface enables a main memory side controller and each core to read the content of a cache in another core directly. The content of a cache is fixed-length data specified by an address of the main memory (called address data).

2. The main memory controller holds the content of caches of all the CPU cores as a history (called address history). As shown in FIG. 5, the address history stores the presence or absence of cache address data in each core.

Figure 1:
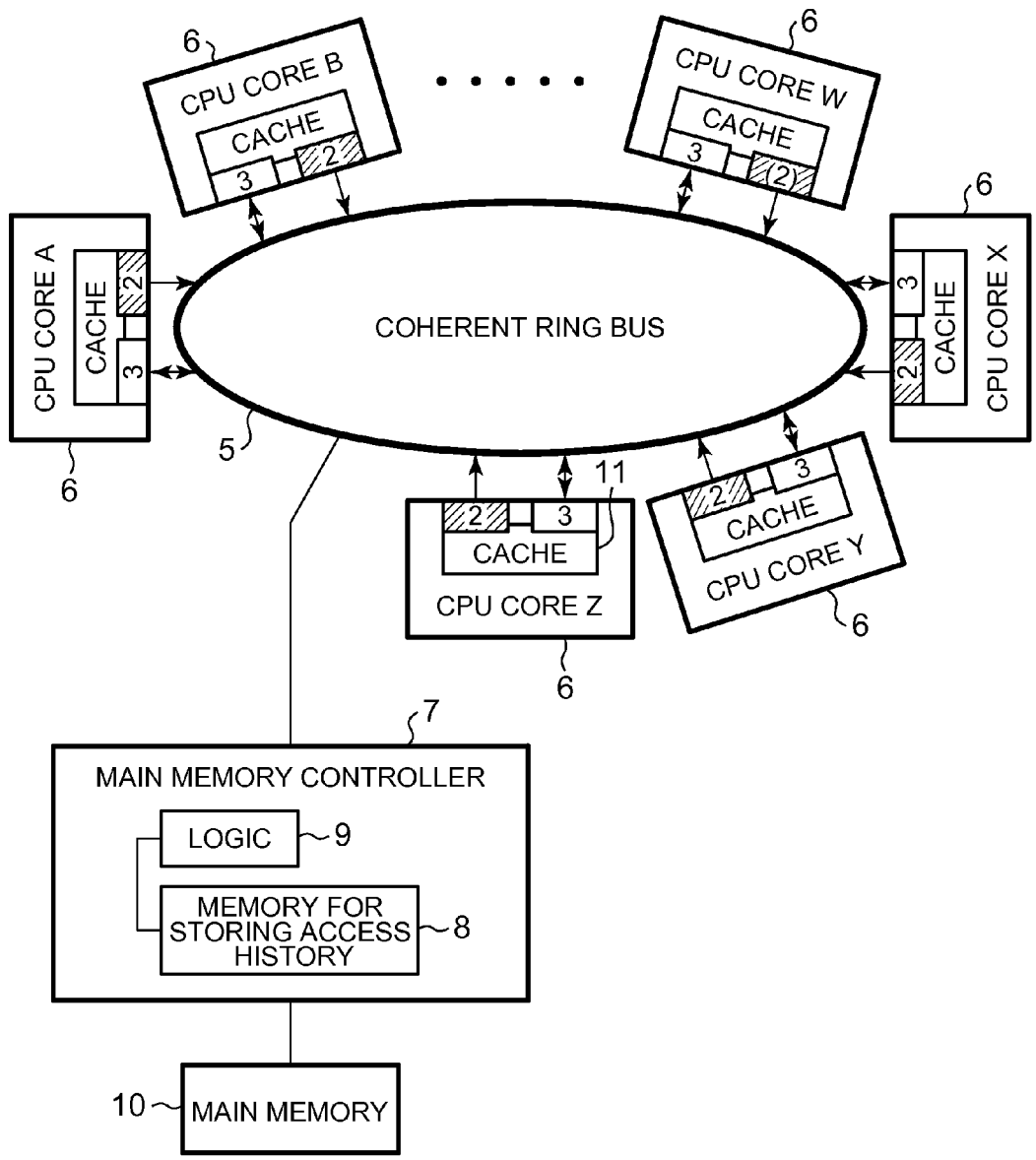
FIG. 1 shows the general structure of a ring bus type multicore system for sharing one memory interface among multiple cores.

FIG. 1 shows the general structure of a ring bus type multicore system for sharing one memory interface among multiple cores.

1. A main memory controller 7 manages, in an access history, a log of memory access status from each core 6. The access history accounts for which CPU core has which address data in its cache.

2. Each CPU core 6 is equipped with a cache controller to enable the main memory controller 7 to read the content of a cache 11.

A certain CPU core issues a request to the main memory controller for reading of specific address data. This CPU core is called a requester core. The cache controller 11 of each of the cores connected on the ring bus up to the main memory controller 7 snoops the content of the coming read request. When having corresponding data in its cache 11, each core picks up the request and returns the data to the requester core.

Suppose first that no CPU core 6 on the way (first path) to a main memory 10 has corresponding data. In this case, the main memory controller 7 receives the request and references an access history 8 of each core. Suppose next that a CPU core 6 connected on a side of the ring (second path) opposite to the direction from which the request comes has the corresponding data. In this case, the read request to a cache 11 is issued to the CPU core 6 having the address data, rather than to the main memory 10.

In the first path, the cache controller sends the address data from the cache 11 of the CPU core through a cache interface 2. Snooping by this controller makes the requester core 6 look as if it has issued the read request to the core having the address data. In this case, the read address data can be sent to the requester core without through the main memory controller 7.

In the second path, the main memory controller pretends to be the requester core to issue the read request directly to the cache of each core. In this case, no extra load is applied to each of the CPU cores (the requester core and the cores having caches to be read). The method of the present invention is effective in terms of reduction in the load on the main memory controller (the effect of reducing the load on the main memory in the first path) and reduction in the time required for memory accesses in all cores (the effect of reducing the load on each core in the second path).

Figure 2:
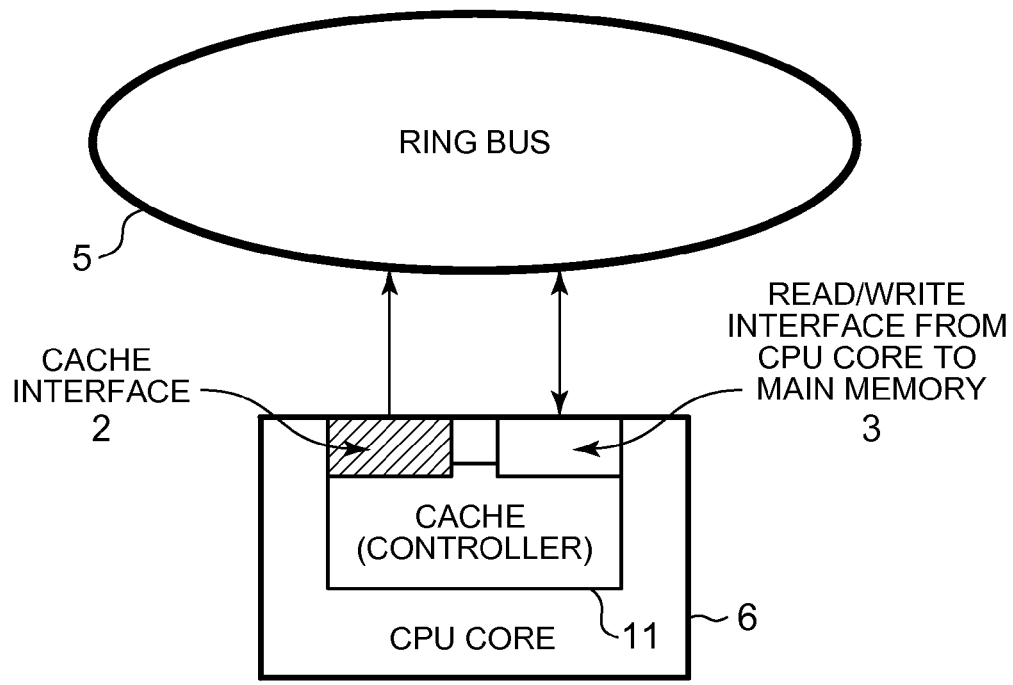
FIG. 2 shows a cache interface 2 in each CPU core and a Read/Write request interface 3 to the main memory.

FIG. 2 shows a cache interface 2 in each CPU core and a Read/Write request interface 3 to the main memory. This idea is considered based on a structure in which multiple CPU cores are packed in a chip and a memory is connected through the main memory controller. Each CPU core and the main memory are connected by a ring bus having coherency. Each CPU core is equipped with the cache interface 2 and the interface 3 through which the CPU core accesses the main memory. Note that the two interfaces 2 and 3 are not necessarily provided separately. For example, the interface 3 may serve as the two interfaces. The separation of the interfaces for each core to snoop a track of the ring bus and to request the main memory to read/write data can avoid a delay in each process.

Figure 3:
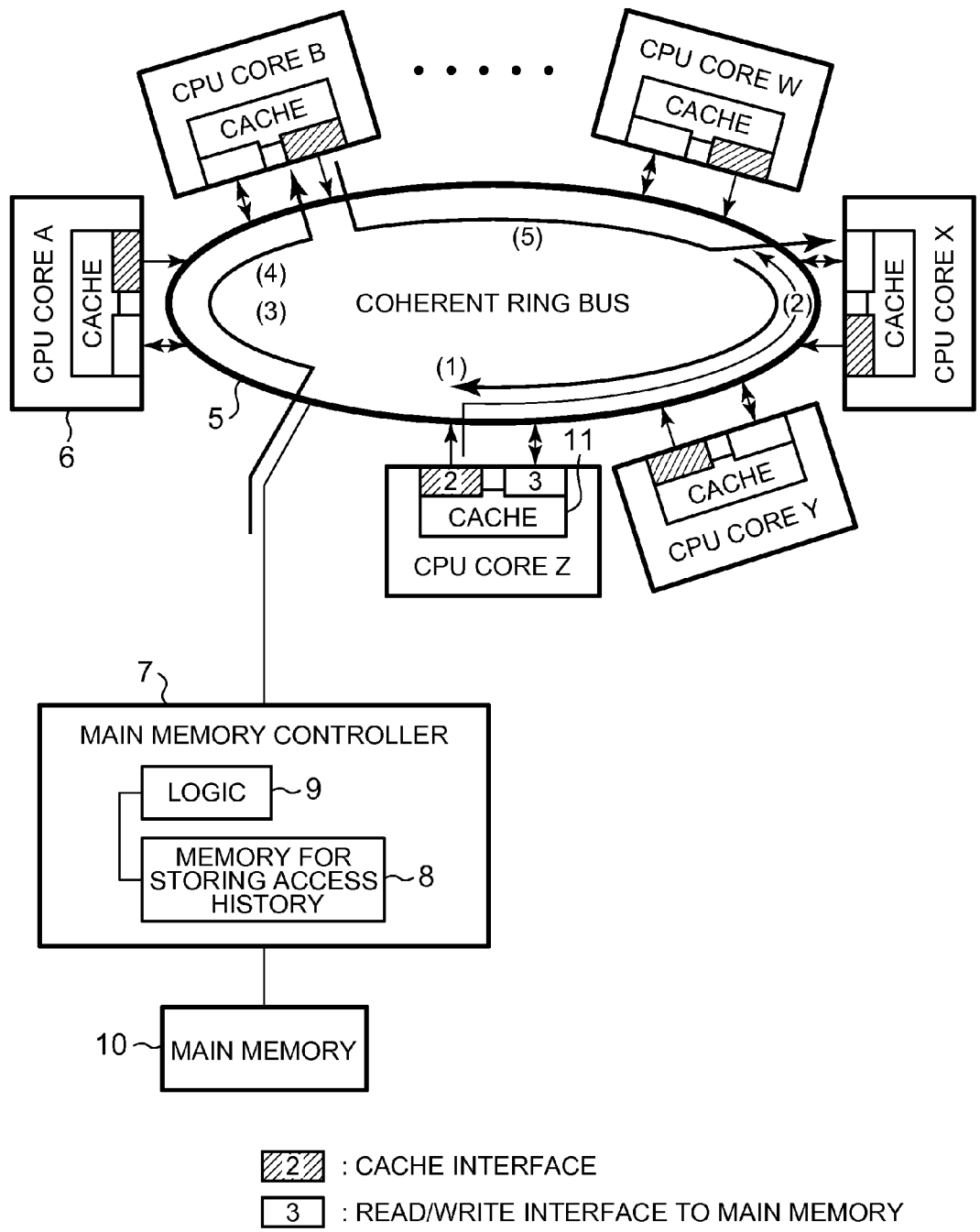
FIG. 3 indicates, by the arrows of steps (1) to (5), a flow of data reading transactions in the general structure of the ring bus type multicore system.
Figure 4:
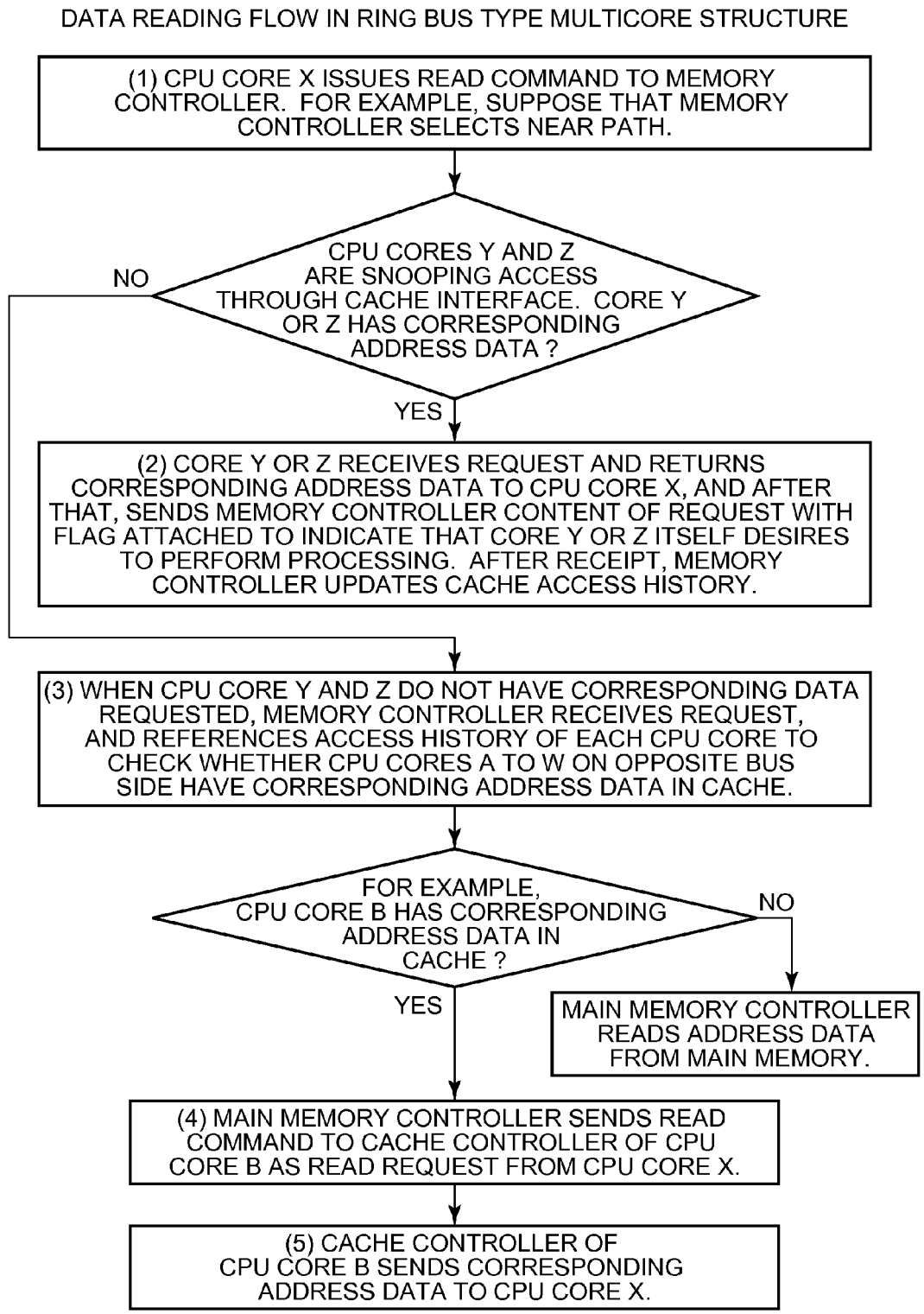
FIG. 4 is a flowchart showing the data reading steps (1) to (5) of the present invention.

FIG. 3 indicates, by the arrows of steps (1) to (5), the order of flows of data reading transactions in the general structure of the ring bus type multicore system. FIG. 4 is a flowchart showing the data reading steps (1) to (5) as a typical example of the present invention.

(1) CPU core X issues a Read command to the main memory controller. It is assumed that a near path is selected as the first path. In this case, for example, the selection of either the near path or the far path as the distance to the main memory controller is decided by the cache controller of the requester core in consideration of factors including traffic and the like:

Near distance leads to fewer CPU cores through which the path to the main memory controller is routed.

Far distance leads to more CPU cores through which the path is routed and by which the path is snooped, thereby increasing the probability of hitting.

(2) CPU core Y and CPU core Z are snooping accesses. When either of the CPU cores has corresponding data, the CPU core receives the request and returns the data to CPU core X, and after that, sends the main memory controller the content of the request with a flag attached to indicate that the CPU core itself desires to perform processing. After receipt, the main memory controller updates the access history of the cache. For example, when CPU core Z has the corresponding data, CPU core Z returns the data to CPU X.

(3) When CPU core Y and CPU core Z do not have the corresponding data requested, the main memory controller receives the request. The main memory controller references the access history, i.e., it references a log of memory accesses of each CPU core to check whether CPU cores A to W on opposite bus side (second path) have corresponding address data in their caches.

(4) For example, suppose that the access history indicates that CPU core B has corresponding data in its cache. In this case, the main memory controller sends the Read command to the cache controller of CPU core B instead of the Read request from CPU core X. As viewed from the cache interface of CPU core B, this looks as if the CPU core B has received the Read request directly from CPU core X.

(5) The cache controller of CPU core B sends the address data to CPU core X. CPU core X receives information from CPU core B as data in response to the Read command issued to the main memory controller.

FIG. 5 shows the content of the access history of each core held in the main memory controller. This history is held by the main memory controller to record whether each of cores A to Z holds data on the address of the main memory (address data) in its cache. The address data normally has a fixed length. When a write flag is Y, it means that request data has been written to the requester core X. At this time, the cache interface of core B snoops the transactions on the ring bus to confirm that core B itself holds the address data of core X. Since core B responds directly to the Read request from core X, the intervention of the main memory controller can be omitted, thereby improving reading performance. After core B completes the processing for sending data to the requester core X, the main memory controller updates the access history.

In step 3 of FIG. 4, the main memory controller checks, in an access history table, whether any of the caches of cores A to W on the opposite bus side holds the requested data. By referencing the access history table, the main memory controller can confirm earlier in the middle of the second path that the cache of core B holds address data 01. The controller sends the Read request and an instruction to core B to send data to core X.

The features of the present invention are as follows: First, since direct reading to each cache itself, rather than to each CPU core, is enabled, no load is applied to each CPU. Since each core on the bus to the main memory snoops and directly returns data, transactions flowing through the ring bus can be omitted, avoiding traffic congestion. Further, when the main memory controller performs reading to the cache of anther core, since the response is directly passed to the requester core, the number of transactions can be reduced even through the main memory controller. In other words, the number of transactions is smaller than that by a method in which the main memory controller side once performs reading from the cache of each CPU core, and after receiving data, returns the read data to the CPU.

In a multicore CPU system of the present invention, the congestion of traffic to the main memory controller on which the number of accesses is anticipated to be high can be avoided. It is contemplated that the more the number of CPU cores, the higher the effect of the present invention. For example, a CPU design plan as a multicore CPU with 128 cores or the like is proposed as a Power PC architecture. According to the present invention, the effect is exerted in a multicore architecture in which the number of cores is especially large.

The invention claimed is:

1. A multicore system in which a requester core makes a read request for data present in a memory, comprising:
   one memory;
   a main memory controller for connecting the memory to a ring bus; and
   a plurality of cores connected to the ring bus, wherein
   each of the cores further includes a cache interface and a cache controller for controlling the interface,
   the main memory controller further includes a cache history of all the cores, and
   in response to the request flowing in a predetermined path direction from the requester core to the main memory controller, the cache controller of each core connected to the ring bus executes:
   a step of snooping data on the request through the cache interface; and
   when the cache of the core connected in the predetermined path direction holds the data, a step of controlling the core to receive the request and return the data to the requester core; or
   when the cache of the core connected in the predetermined path direction does not hold the data, the main memory controller references the history of each core, and when any core connected to the ring bus in a reverse path direction to the predetermined path direction holds corresponding data, the main memory controller executes:

a step of sending the request to the cache of the core and causing the cache controller of the core to send the data held in the cache to the requester core; or when no core connected to the ring bus in the reverse path direction to the predetermined path direction holds corresponding data, a step of reading the data from the memory and sending the data to the requester core.

2. The multicore system according to claim 1, wherein the history includes, for each of the cores, a flag indicative of holding data on an address of the memory and a write flag to another core.

3. The multicore system according to claim 2, wherein the cache controller selects, as the predetermined path direction, a path with a larger number of cores connected in two path directions from the requester core to the main memory controller.

4. The multicore system according to claim 3, wherein the cache controller references the history to calculate traffic of the ring bus from the data hold flag and select a path direction with less traffic as the predetermined path direction.

5. The multicore system according to claim 4, wherein the main memory controller references the history to check for the presence of the data in a core connected to a path reverse to that in the predetermined path direction.

6. A method of causing a requester core in a ring bus type multicore CPU to read data present in a memory, in which the multicore CPU includes one memory, a main memory controller for connecting the memory to a ring bus, and a plurality of cores connected to the ring bus, and each of the cores further includes a cache interface and a cache controller for controlling the interface, and the main memory controller further includes a history of data held in all the cores, and in response to the request flowing in a predetermined path direction from the requester core to the controller, the cache controller of each core connected to the ring bus includes:

a step of snooping data on the read request through the cache interface; and when the cache of the core connected in the path direction holds the data, a step of controlling the core to receive the request and return the data to the requester core, or when the cache of the core connected in the path direction does not hold the data, the main memory controller references the history of each core, and when any core connected to the ring bus in a reverse path direction to the path direction holds corresponding data, the main memory controller includes:

a step of sending the request to the core and causing the cache controller of the core to send the data held in the cache to the requester core; or when no core connected to the ring bus in the reverse path direction to the path direction holds corresponding data, a step of reading the data from the memory and sending the data to the requester core.

* * * * *